United States Patent Office 3,132,419
Patented May 12, 1964

3,132,419
METHOD FOR SOLDERING SILICON OR A SILICON ALLOY TO A DIFFERENT METAL
Teizo Takikawa, 871 Kitanomachi, Chofu, Tokyo, Japan
No Drawing. Filed May 20, 1960, Ser. No. 30,434
Claims priority, application Japan June 6, 1959
1 Claim. (Cl. 29—473.1)

The present invention relates to a method for soldering silicon or a silicon alloy to the same or a different metal.

In the soldering of silicon or a silicon alloy to the same kind or a different kind of metal that is widely used in the electronics industry, unlike in the case of general electric instruments, it is desirable to satisfy special requirements. That is, the soldered joint must have sufficient mechanical strength, must have low electrical resistance, should have high resistance to deterioration to match the characteristics of a semi-conductor, should be quite clean after soldering, etc. Hitherto, to satisfy these requirements, various preliminary treatments, such as use of special fluxes, plating of any noble metal, mechanical polishing of silicon surface, etc., and, also, various complicated operations, such as decreasing as much as possible the amount of flux and other assistants and solder used, and preventing corrosion by means of various washing methods after soldering, have been used. No simple treatment has been found.

The present inventor has discovered that a certain class of Zn solder has a peculiar affinity in the soldering of silicon or a silicon alloy ot a different metal, and that, by taking advantage of this characteristic, said soldering can be accomplished in the clean state without using flux and other assistants and without requiring any preliminary or after treatment. That is, a low-temperature solder composed essentially of Zn-Al-Cu system as described below includes a composition having an increased affinity to silicon or a silicon alloy. There are some difficulties in an operation of direct soldering between said solder and a solder of Pb-Sn system used for soldering different metals because of the difference in expansion coefficients of the two types of solders.

It is an object of the present invention to provide a method of soldering silicon or a silicon alloy to different metals more easily by interposing a low-temperature solder of Zn-Al-Cu-Sn system between said solder and a solder of Pb-Sn system.

The solder used in the present invention is as follows:

|  | Zn-Al-Cu system, percent | Zn-Al-Cu-Sn system, percent |
|---|---|---|
| Al | 0–21.0 | 0–17.2 |
| Vu | 0–18.2 | 0– 4.6 |
| Zn | Remainder | 12.0–41.6 |
| Sn |  | Remainder |
| Fe, Pb and other impurities | <3.2 | <2.1 |

The solder of Zn-Al-Cu system in the present invention has an intimate solderability with silicon or its alloy which makes it possible to conduct soldering without removing the oxide film present on the surface of silicon or its alloy.

A solder of Zn-Al-Cu-Sn system is difficult to solder to silicon or its alloy, but can fully be soldered to a solder of Zn-Al-Cu system or a solder of Pb-Sn system.

In soldering silicon or its alloy and a different metal in accordance with the present invention, the solder of Zn-Al-Cu system is first applied with light pressure to silicon or its alloy at a temperature of the melting point of said solder to form a thin layer of said solder, followed by soldering the solder of Zn-Al-Cu-Sn system onto said thin layer at a temperature of the melting point of the solder, and then said soldered portion is soldered to a different metal by the ordinary method using a solder of Pb-Sn system.

The soldering in the present invention is sufficiently conducted by applying the solder with light pressure on silicon or a silicon alloy maintained at a temperature neighbouring the melting point of said solder as descibed above and does not require a flux or other assistants and, further, does not require any preliminary operation such as plating of noble metals on a soldered surface or mechanical polishing thereof, etc. Also, there is no necessity of conducting any complicated operation such as soiling or washing the soldered portion, or giving any consideration to the aging of the treated portion.

The soldering obtained in accordance with the present method is of sufficient mechanical strength. For example, a lead wire soldered on a piece of silicon by the present soldering is not separated at a point of soldering by tension, but causes partial stripping of the silicon crystal. Further, the present soldering is so-called "ohmic welding," and it is electrically low resistant and shows remarkably excellent properties fitted for semi-conductor instrument as compared with one soldered by means of the prior methods.

Therefore, in accordance with the method of the present invention, a simple method for soldering a silicon or its alloy directly to a different metal which has hitherto been considered difficult or impossible has become possible, and, thus, the present method can be expected to contribute greatly to the development of the electronics industry.

Further, according to the present method, the soldering of silicon to silicon or a silicon alloy to a silicon alloy or silicon to a silicon alloy can easily be accomplished by using the above solder of Zn-Al-Cu system only, and the present soldering can use other solder instead of that of Pb-Sn system depending on the kinds of metals to be soldered. Especially, soldering of aluminum or its alloy, something which has been impossible with a solder of Pb-Sn system in the prior art, can be accomplished by a solder of Zn-Al-Cu system or Zn-Al-Cu-Sn system. And, in the present invention, to interpose a solder of Zn-Al-Cu-Sn system is not an absolute requirement to be met in soldering a solder of Zn-Al-Cu system to a solder of Pb-Sn system or of other system. Reduction of the ratio of Cu to Al in the above composition makes possible direct soldering of said solder to a solder of Pb-Sn system. In this case, the object can be accomplished by first soldering at a temperature neighbouring the melting point of said solder, and then soldering by the ordinary method using a solder of Pb-Sn system.

Among the impurities in said solder employed in the present method, the presence of Pb, Fe, Cd, etc. is the most injurious. The presence of Na, Si, Ca, Mg, etc. has little influence.

The present invention is illustrated by the following examples:

EXAMPLE 1

A solder composed of Al 4.3%, Cu 5.0%, impurities less than 0.06% and Zn which is the remainder, all by weight, is applied with light pressure onto a piece of highly pure silicon being heated at a temperature of approximate 400° C. to form a thin layer of said solder on said silicon piece. Then, a solder composed of Al 15%, Cu 2.0%, impurities less than 0.05% and Zn which is the remainder, all by weight, is soldered on the above thin layer on said silicon piece being heated at a temperature of approximate 300° C. This is cooled to a room temperature and is soldered to a different metal by the ordinary method using a solder of Pb-Sn system to obtain a silicon transistor. The product shows excellent mechanical and electrical properties as a semi-conductor instrument.

EXAMPLE 2

A solder composed of Al 9.0%, Cu 1.2%, impurities composed essentially of Si and Mg less than 1.2% and Zn which is the remainder, all by weight, is applied with light pressure onto a piece of highly pure silicon being maintained at a temperature of approximate 400° C. to form a thin layer of said solder on said silicon piece. After cooling, said soldered portion is soldered to a lead wire by the ordinary method using a solder of Pb-Sn system to obtain a semi-conductor instrument having sufficiently high mechanical strength and low electrical resistance.

The invention has been described in detail with particular reference to preferred embodiments thereof, but it will be understood that variations and modifications can be effected within the spirit and scope of the invention as described hereinabove and as defined in the appended claim.

What is claimed is:

A method for soldering silicon and silicon alloys to a different metal comprising the steps of: firstly, pressing a solder composed by weight of Al 4.3%, Cu 5.0%, impurities less than 0.06% and of zinc as the remainder on a pure silicon work-piece, heated to 400° C. to form a first layer of solder on the surface of said silicon work-piece; secondly, soldering to said first layer of solder, heated to about 300° C. a second solder composed by weight of 15% Al, 2.0% Cu, impurities less than 0.05% and Zn as the remainder; thirdly, cooling the soldered work-piece to room temperature; and fourthly, soldering a different metal to said second solder layer by the ordinary method using a solder of the Pb-Sn system.

References Cited in the file of this patent

UNITED STATES PATENTS

| | | |
|---|---|---|
| 2,087,716 | Banscher | July 20, 1937 |
| 2,434,555 | Fischer et al. | Jan. 3, 1948 |
| 2,735,163 | Brooks et al. | Feb. 21, 1956 |
| 2,856,681 | Lacy | Oct. 21, 1958 |
| 2,906,647 | Roschen | Sept. 29, 1959 |
| 2,945,285 | Jacobs | July 19, 1960 |
| 2,987,813 | Pope et al. | June 13, 1961 |
| 3,030,703 | Wirsing | Apr. 24, 1962 |
| 3,046,640 | Singleton | July 31, 1962 |